United States Patent
Karaoguz

(10) Patent No.: US 8,355,759 B2
(45) Date of Patent: *Jan. 15, 2013

(54) POWER MANAGEMENT OF RADIO TRANSCEIVER ELEMENTS

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,100

(22) Filed: Apr. 12, 2012

(65) Prior Publication Data

US 2012/0196553 A1 Aug. 2, 2012

Related U.S. Application Data

(63) Continuation of application No. 12/396,626, filed on Mar. 3, 2009, now Pat. No. 8,180,409, which is a continuation of application No. 10/277,787, filed on Oct. 22, 2002, now Pat. No. 7,512,423.

(60) Provisional application No. 60/403,224, filed on Aug. 12, 2002.

(51) Int. Cl.
*H04B 1/06* (2006.01)
(52) U.S. Cl. ........................ 455/574; 455/572
(58) Field of Classification Search ............... 455/456.4, 455/528, 572, 573, 574, 343.2
See application file for complete search history.

(56) References Cited

U.S. PATENT DOCUMENTS

| 6,073,035 A * | 6/2000 | Witter | 455/574 |
| 2001/0034254 A1 * | 10/2001 | Ranta | 455/574 |

* cited by examiner

*Primary Examiner* — Sam Bhattacharya
(74) *Attorney, Agent, or Firm* — Garlick & Markison; Holly L. Rudnick

(57) ABSTRACT

A radio receiver includes a power control module for selectively powering down and powering up radio receiver elements in between known communication periods according to one aspect of the present invention. According to a second aspect of the invention, the radio receiver operates in a low power mode of operation and periodically "sniffs" to determine whether an access point has messages or communication signals to transmit to it.

20 Claims, 9 Drawing Sheets

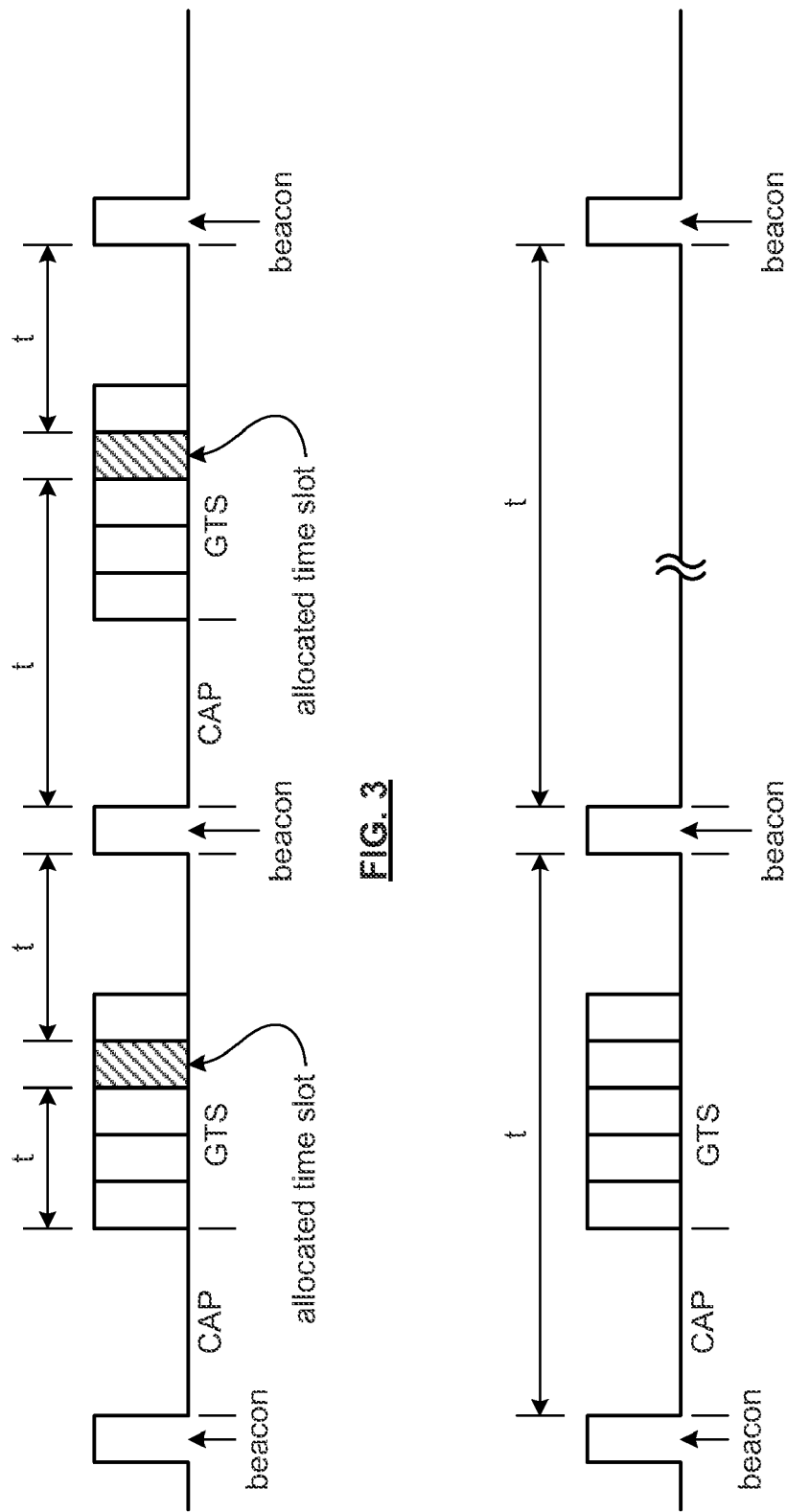

POWER MANAGEMENT OF RADIO TRANSCEIVER ELEMENTS

CROSS-REFERENCE TO RELATED APPLICATIONS

The present U.S. Utility Patent Application claims priority pursuant to 35 U.S.C. §120, as a continuation to the following U.S. Utility Patent Application which is hereby incorporated by reference in its entirety and made part of the present U.S. Utility Patent Application for all purposes:

1. U.S. Utility patent application Ser. No. 12/396,626, entitled "Power Management of Radio Transceiver Elements," filed Mar. 3, 2009, pending, which claims priority pursuant to 35 U.S.C. §120, as a continuation to the following U.S. Utility Patent Application which is hereby incorporated herein by reference in its entirety and made part of the present U.S. Utility Patent Application for all purposes:
   a. U.S. Utility patent application Ser. No. 10/277,787 entitled "Power Management of Radio Transceiver Elements," filed Oct. 22, 2002, issued on Mar. 31, 2009 as U.S. Pat. No. 7,512,423, which claims priority pursuant to 35 U.S.C. §119(e) to the following U.S. Provisional Patent Application which is hereby incorporated herein by reference in its entirety and made part of the present U.S. Utility Patent Application for all purposes:
      i. U.S. Provisional Patent Application Ser. No. 60/403,224, entitled "Power Management of Radio Receiver Elements," filed Aug. 12, 2002, expired.

BACKGROUND OF THE INVENTION

1. Technical Field of the Invention

This invention relates generally to wireless communication systems and more particularly to radio frequency integrated circuits used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

For each wireless communication device to participate in wireless communications, it either includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency (IF) stages, and a power amplifier. The data modulation stage converts raw data into baseband signals in accordance with a particular wireless communication standard. The one or more IF stages mix the baseband signals with one or more local oscillations to produce RF signals. The power amplifier amplifies the RF signals prior to transmission via an antenna.

As is also known, the receiver is coupled to the antenna and includes a low noise amplifier, one or more IF stages, a filtering stage, and a data recovery stage. The low noise amplifier receives inbound RF signals via the antenna and amplifies then. The one or more IF stages mix the amplified RF signals with one or more local oscillations to convert the amplified RF signal into baseband signals or IF signals. The filtering stage filters the baseband signals or the IF signals to attenuate unwanted out-of-band signals to produce filtered signals. The data recovery stage recovers raw data from the filtered signals in accordance with the particular wireless communication standard.

Each of the various stages of the radio receiver consume differing amounts of power. Because it is desirable to extend battery life to a maximum amount, many devices provide for a sleep mode in which the device is powered down until activated by the depression of a key or the like. Some of the wireless communication standards provide for powering down a receiver for a specified period of time and then powering the receiver back up to enable it to engage in communications. The current designs and proposals, however, do not provide specific suggestions for maximizing the amount of power savings and do not provide for power saving modes and periods that maximally extend battery life.

Therefore, a need exists for a power management mode of operation that improves the power management functionality of a radio receiver and that maximizes battery life before recharging is required.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 3 is a timing diagram of a radio receiver operating in accordance with the present invention;

FIG. 4 is a timing diagram of a radio receiver operating in accordance with the present invention;

DETAILED DESCRIPTION OF THE INVENTION

Figure 1:
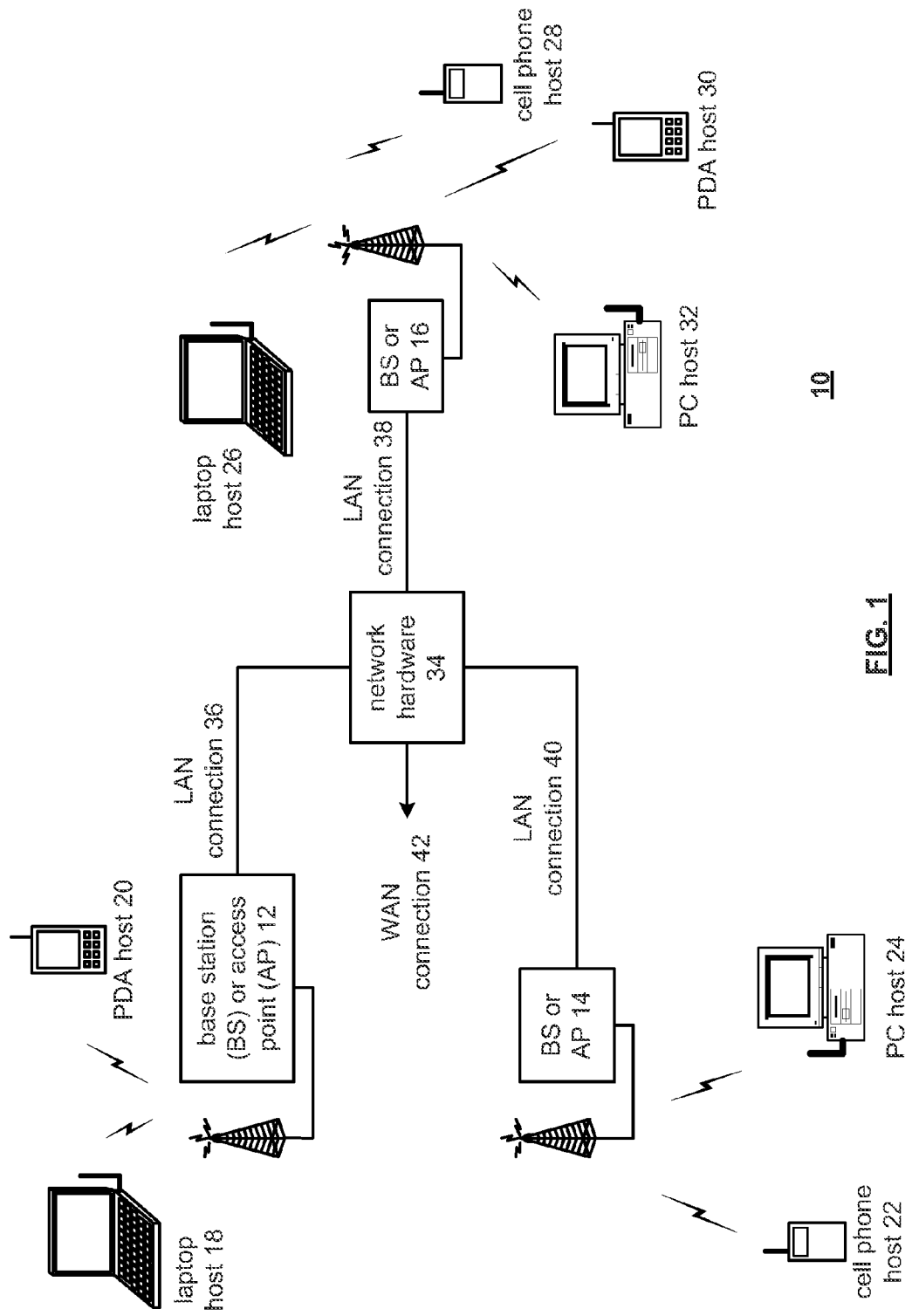
FIG. 1 is a schematic block diagram of a wireless communication system in accordance with the present invention.

A radio receiver includes functionality for selectively powering down radio receiver elements in a manner that maximizes battery life. A control module of a radio receiver evaluates, on a radio receiver element-by-element basis, whether the element may be powered down, when it should be brought back up, and what type of power down mode should be utilized therefor. Accordingly, by considering the amount of time that is required to power down and power back up (power cycle time) the element in relation to the amount of available time to do so, the control module can selectively power down radio receiver elements to conserve power and battery life of the radio receiver. Additionally, in one embodiment of the invention, the control module not only considers whether there is enough time to power down an element and back up, but also whether the power consumed in doing so is less than the power saved during the period in which the element is powered down. Thus, the control element serves to intelligently manage power consumption on an element-by-element basis.

As another aspect of the present invention, elements having similar power cycle time values or characteristics may be grouped together wherein they are powered down and back up jointly. Further, an element, as defined herein, is not necessarily limited to an entire module or block. For example, a local oscillator may be separated into a plurality of components, each having separate power cycle times. More specifically, the elements of a local oscillator include a crystal, a crystal amplifier, a phase-locked-loop (PLL), and a clock distribution tree. Each of these four elements have differing power cycle times. The PLL has the greatest power cycle time because it has the greatest recovery (power-up) time. Thus, the present invention provides for partially powering down circuit modules according to power cycle characteristics of each of the components and component blocks therein. Similarly, a medium access control (MAC) device may be broken into at least two component blocks having different power cycle characteristics and, therefore, may be controlled separately to minimize power consumption.

One advantage of the present invention is that power consumption utilizing traditional circuit designs may be minimized. Further, a designer implementing the present invention may determine through experimentation for his or her particular design, that power consumption may be reduced by designing circuit component blocks having greater complexity and operational power consumption but that have faster power cycle time characteristics. For example, if a first design has a power cycle characteristic that does not allow it to be powered down and back up during a period in which a transceiver is in a transmit mode of operation, a second design, while consuming more power during a receive mode of operation but having a shorter power cycle time, may be powered down during the transmit mode of operation thereby consuming less power on average. These and other advantages may be better understood in view of the description of the figures that follow.

FIG. 1 is a schematic block diagram illustrating a communication system 10 that includes a plurality of base stations or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver. The radio transceiver includes a highly linear amplifier and/or programmable multi-stage amplifier, as disclosed herein, to enhance performance, reduce costs, reduce size, and/or enhance broadband applications.

Figure 2:
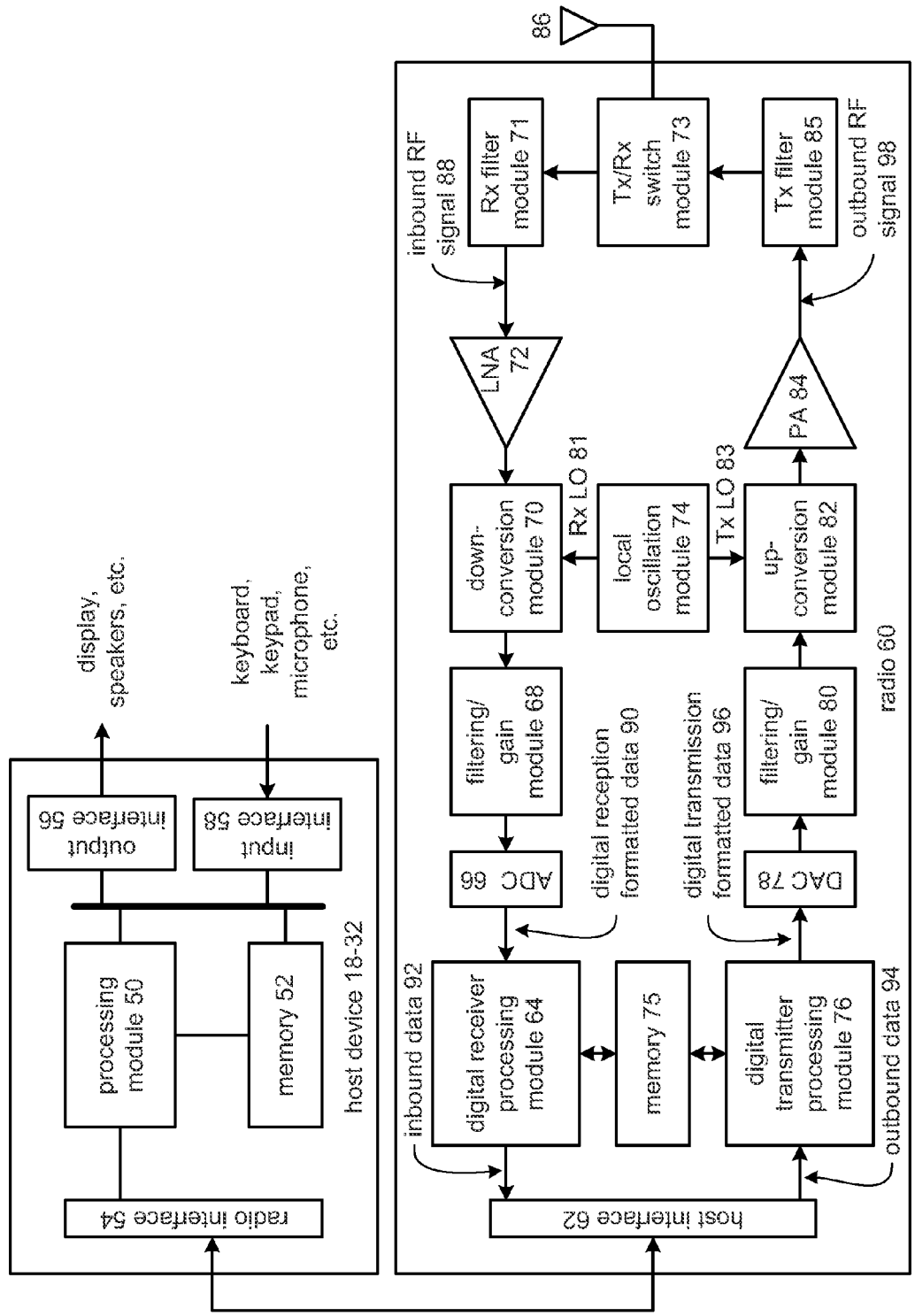
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device, such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, an IF mixing down-conversion module 70, a receiver filter module 71, a low noise amplifier 72, a transmitter/receiver switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 may be a single antenna that is shared by the transmit and receive paths as regulated by the Tx/Rx switch module 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital IF to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing up-conversion module 82 directly converts the analog baseband or low IF signal into an RF signal based on a transmitter local oscillation 83 provided by local oscillation module 74, which may be implemented in accordance with the teachings of the present invention. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the IF mixing down-conversion module 70, which directly converts the amplified inbound RF signal into an inbound low IF signal or baseband signal based on a receiver local oscillation 81 provided by local oscillation module 74, which may be implemented in accordance with the teachings of the present invention. The IF mixing down-conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, while the digital receiver processing module 64, the digital transmitter processing module 76 and memory 75 may be implemented on a second integrated circuit. The remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76, respectively, may be a common processing device implemented on a single integrated circuit. Further, memory 52 and memory 75 may be implemented on a single integrated circuit and/or on the same integrated circuit as the common processing modules of processing module 50 and the digital receiver processing module 64 and digital transmitter processing module 76.

Some or all of radio 60 of FIG. 1 includes power management functionality to enable a power management controller to selectively power down and power up radio receiver elements according to a plurality of different modes or aspects of operation, as is described in greater detail with reference to the figures that follow. Moreover, the radio receiver elements that may be powered down and back up to conserve power do not necessarily consist of an entire module. For example, the local oscillation module 74 may be separated into a plurality of elements for power management purposes because each of the components therein have differing power cycle times. For example, the local oscillation module 74 includes a crystal, a crystal amplifier, a PLL and a clock distribution tree in one embodiment of the invention. These elements do not all have equal power cycle characteristics and may, therefore, be controlled separately for power management purposes.

FIG. 3 is a timing diagram of a radio receiver operating in accordance with the present invention. Referring now to FIG. 3, an IEEE 802.15.3 Standard Defined communication for high data rate wireless personal area networks includes the transmission of periodic beacons that signal the beginning of a communication signal that is, in turn, followed by a contention access period (CAP) and at least one allocated time slot for data communications. Under 802.15.3, the period between beacons is typically in the range of ten to a few hundred milliseconds. Typically, in a time division multiple access (TDMA) environment, a plurality of allocated time slots follow the CAP wherein each time slot is allocated for communications for a particular radio device. Thus, according to the protocol, a plurality of guaranteed time slots (GTS) follow the CAP. A particular radio knows which allocated time slot is allocated for its use and, therefore, how much time exists until that designated time slot begins.

Accordingly, the present invention includes powering down specific radio receiver elements according to a plurality of factors, including power down time, power up time required, the duration of a power down period (and thus the relative power savings) in relation to additional power required to bring the radio receiver/transmitter element back into an operational state. The value of "t" represents the time between beacons, the time from CAP to the allocated time slot of the GTS, the time from the allocated time slot to the subsequent beacon, and the time from a beacon to the allocated time slot of the GTS. Thus, as may be seen, the timing of the allocated time slot with respect to each of the other portions of the signal is known. Accordingly, a controller operating according to the present invention may readily calculate an amount of time "t" until an allocated time slot arrives as a part of determining whether to place a specified radio receiver element in to a power down state or mode of operation.

FIG. 4 is a timing diagram of a radio receiver operating in accordance with the present invention. As before, the beacons are separated by a specified period ("t"). Typical values for the specified period can range from approximately ten milliseconds to approximately hundreds of milliseconds for some communication networks and protocols and by even greater values for other networks and protocols. FIG. 4 specifically illustrates that a power control module may determine to place a radio receiver element, or a plurality of radio receiver elements, in a power down mode of operation for a specified number of beacons (a specified amount of time). For example, according to one embodiment of the present invention, the power control module determines to place the at least one radio receiver element into a reduced power mode of operation for a period equal to ten beacons (hundreds to thousands of milliseconds).

Figure 5:
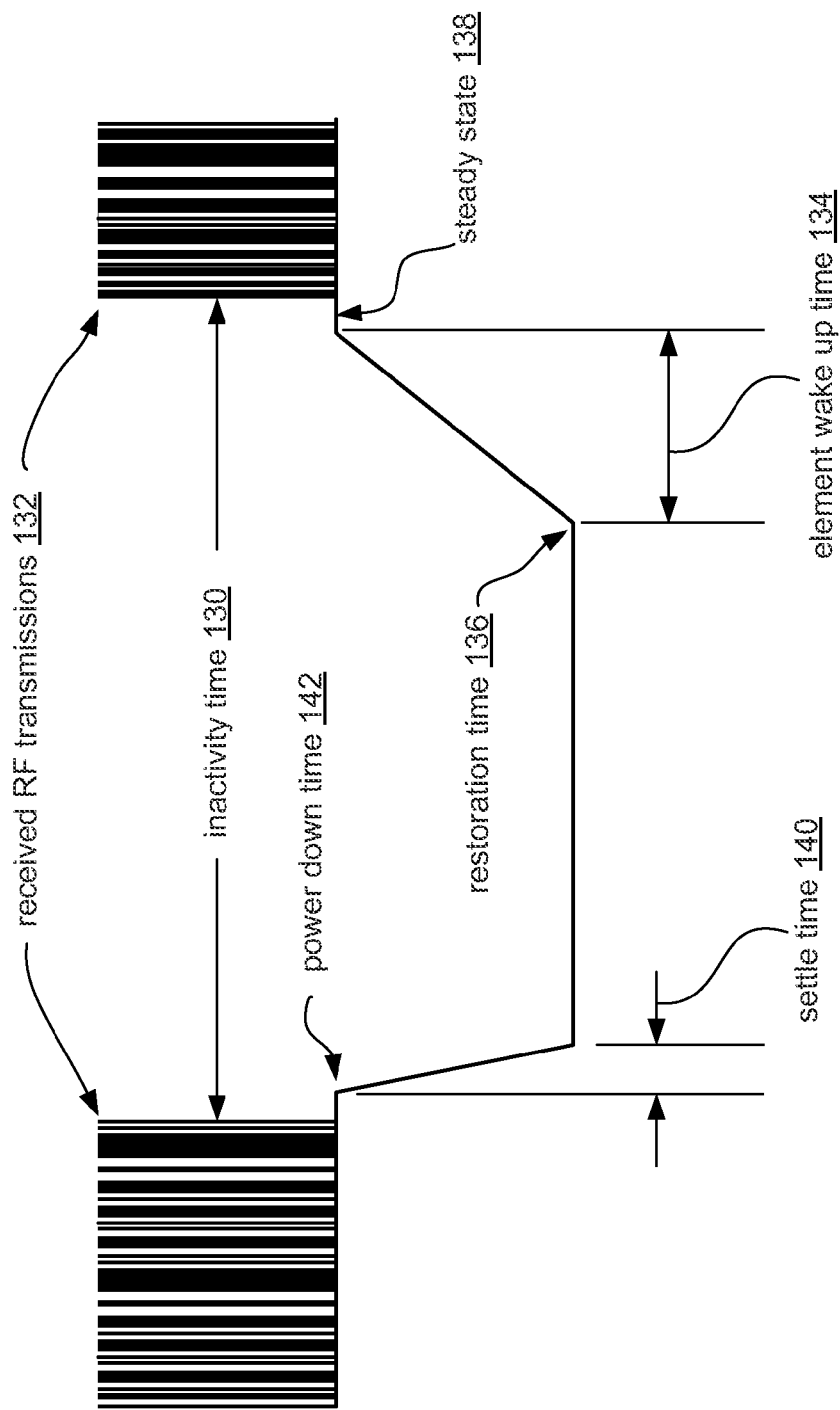
FIG. 5 is a timing diagram illustrating power reduction operation in accordance with an embodiment of the present.

FIG. 5 is a timing diagram illustrating power reduction operation in accordance with an embodiment of the present invention and, more specifically, a method for power reduction. A power control module determines an inactivity time 130. In the example, the inactivity time is time between received RF transmissions 132. The power control module determines if any receiver element can be powered off and powered up during the inactivity time 130 in order to save power. The power control module uses a known element wake up time 134 to calculate a restoration time 136. The restoration time indicates when the element must be powered on in order achieve an operational mode steady state 138 prior to the expiration of the inactivity time 130. If sufficient time exists between a known settle time 140 and the restoration time 136 to justify powering the element down and the back up, a power savings maybe be realized. Accordingly, the power control module instructs the element to power down at power down time 142. The element remains in a reduced power mode (either off or operating at a lower power level) until the restoration time 136. At restoration time 136, the element is powered back on.

Figure 6:
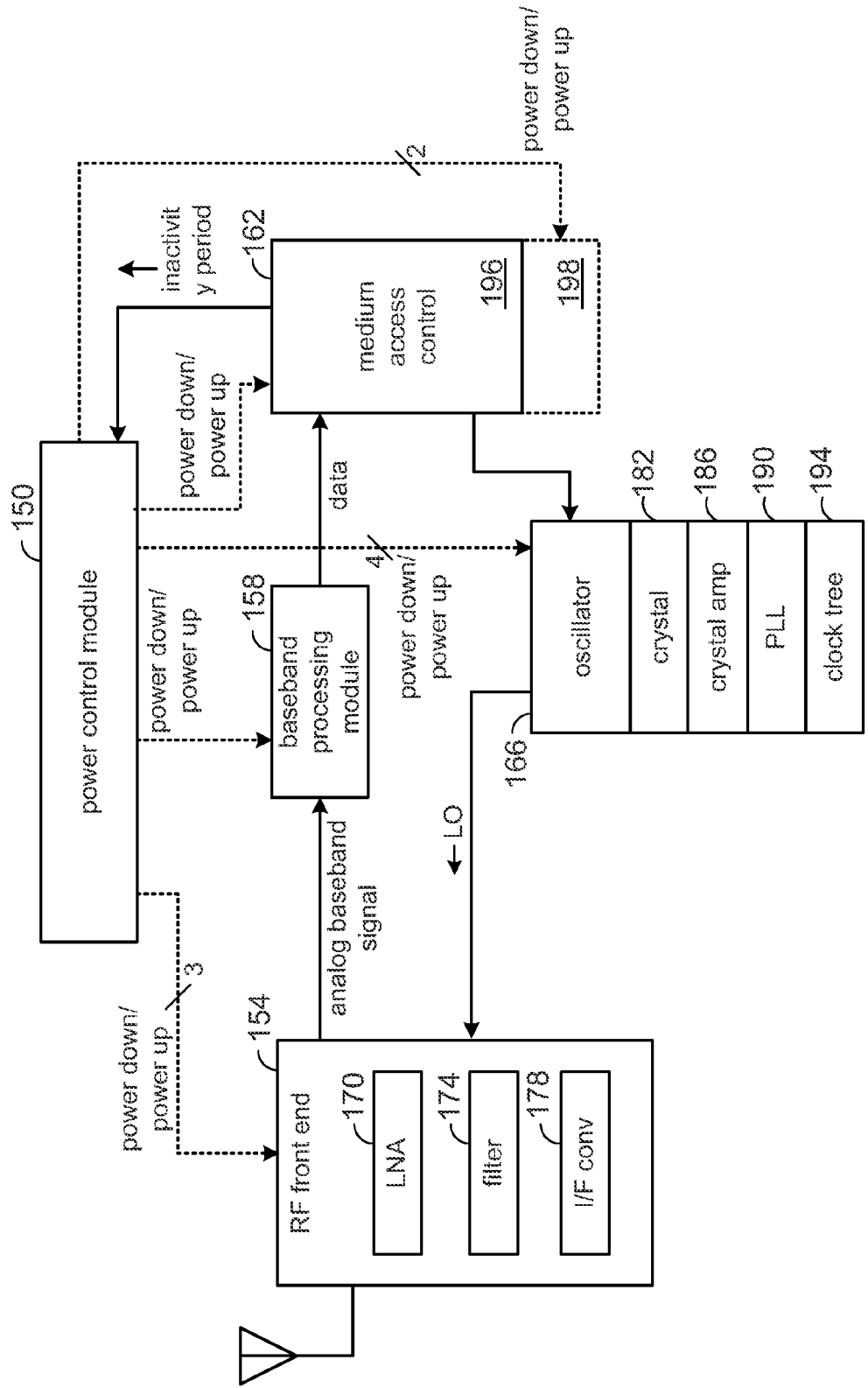
FIG. 6 is a functional block diagram illustrating one embodiment of a receiver path of a handheld host according to the present invention.

FIG. 6 is a functional block diagram illustrating one embodiment of a receiver path of a handheld host according to the present invention. As may be seen, a power control module 150 is coupled to provide power management control for each radio receiver element shown therein. More specifically, the power control module 150 is coupled to provide power up and power down signals to each element of the radio receiver elements shown therein FIG. 6. Each element shown in FIG. 6 has a specified power down and power up period. Some elements have a power up period that is approximately equal to 4 or 5 microseconds, while other elements (e.g., an oscillator) require 4 or 5 milliseconds to power up. Thus, the power control module 150 determines whether to power down and power up a particular element according to the amount of time that it takes to power it down, power it up, and the amount of power consumed therefor in relation to the amount saved for the period in which the radio receiver element will be in a power down state of operation.

More specifically, power control module 150 is coupled to provide power down and power up signals to a plurality of radio transceiver circuit elements, including an RF front end module 154, a baseband processor module 158, a medium access control (MAC) module 162 and a local oscillator module 166. The RF front end module 154 further includes a low noise amplifier 170, a filter module 174 and an intermediate frequency (I/F) conversion module 178. Similarly, local oscillator module 166 includes a crystal 182, a crystal amplifier 186, a phase-locked loop (PLL) 190 and a clock distribution tree 194. Finally, the MAC module 162 includes first and second portions 196 and 198.

Each of these transceiver elements has a settle time based upon many factors, including, for example, time constants from a combination of capacitive, inductive and resistive impedance elements therein. Accordingly, the power control module 150 can determine whether to power down the transceiver elements and then back up based upon the known settle time for each transceiver element. In the described embodiment of the invention, radio power management controller 150 includes the ability to individually generate power down and power up commands to each transceiver element based upon the known corresponding settle times.

Regarding the specified power up and power down period of each radio transceiver element as referenced above, circuit elements may be designed to have faster or slower wake up times. In the past, designers typically considered IC real estate, power, and operational speed in designing integrated circuits. With the trend towards improving capabilities of wireless mobile radio transceivers, however, power consumption is becoming an increasingly important consideration. Thus, circuits may be designed having shorter power cycle times or characteristics at the cost of, for example, IC real estate. Such a design would be feasible if, for example, the average power consumed by a circuit component is reduced by implementing a design that consumes greater power while operating but, because of shorter power cycle times, may be powered down on a more frequent basis utilizing the present invention.

While not specifically shown in FIG. 6, there are other elements to which the present invention applies. For example, an analog to digital converter in a radio receiver may also be powered down and then back up. Thus, the present invention applies to all radio receiver elements. As may be seen from FIG. 6, the MAC module 162 provides a inactivity period to power control module 150. Thus, if MAC module 162 determines that the inactivity period is just until the next allocated time slot is to arrive, power control module 150 will only power down those radio receiver elements for which a power savings could be realized and for which there exists adequate time to power the radio receiver element down and then back up. For example, if the allocated time slot is to arrive in 3 milliseconds, local oscillator 166 would not be powered down completely, instead, an analog-to-digital converter with a 4 to 5 microsecond power up time value would be powered down. For those radio receiver elements that cannot be powered down fully, power control module 150 also considers a reduced power down mode. For example, in the case of local oscillator 166, the frequency of oscillation may be significantly reduced to save power, but only to a value that would enable it to be brought back up to the operational frequency in a specified amount of time. As there exists a relationship for an oscillator between voltage and power required in relation to frequency of operation, even a reduced frequency mode of operation saves power.

Figure 7:
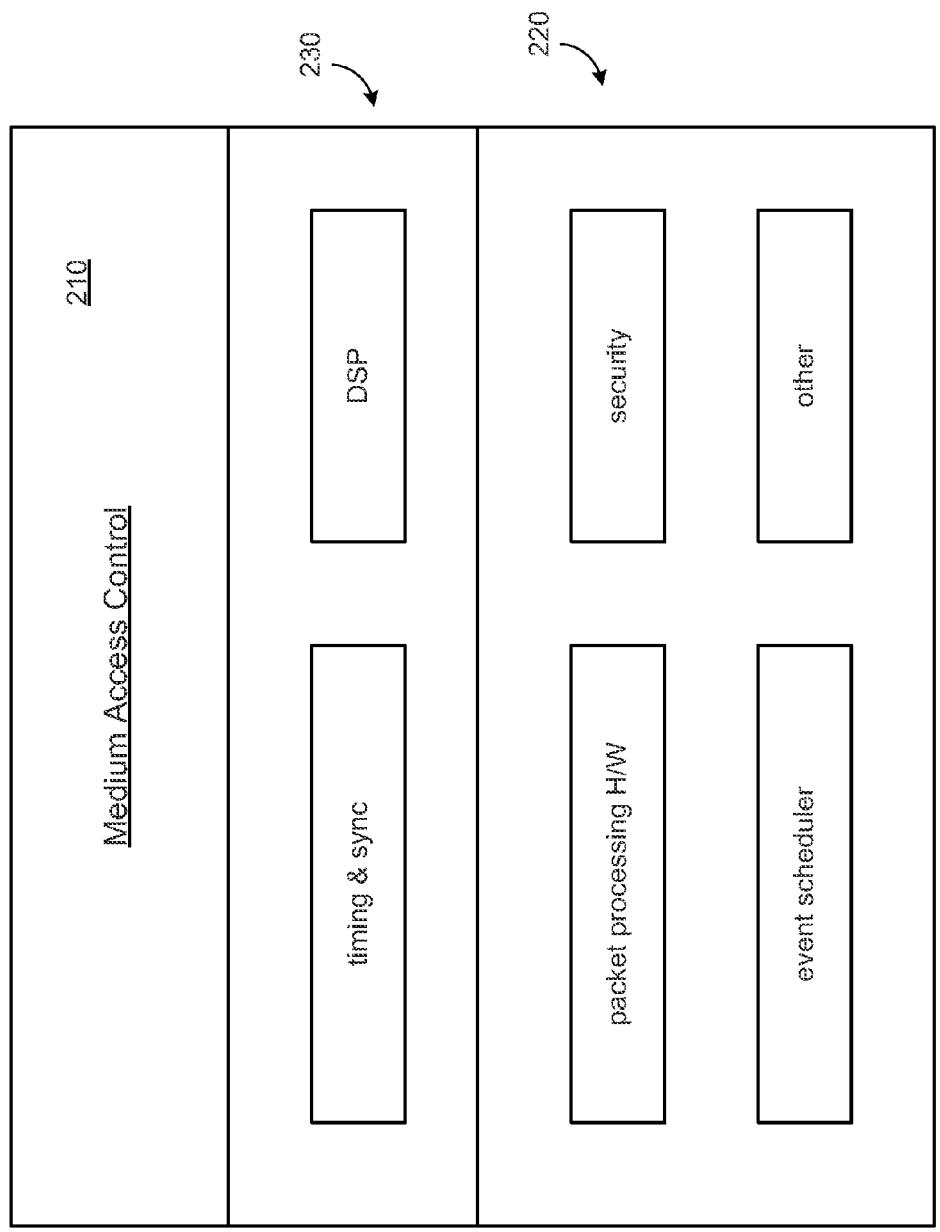
FIG. 7 is a functional block diagram of a medium access control (MAC) module illustrating one aspect of the present embodiment of the invention.

FIG. 7 is a functional block diagram of a medium access control (MAC) module illustrating one aspect of the present embodiment of the invention. The MAC 210 module of FIG. 7 illustrates that it includes a plurality of portions (here, two). Each of the portions is separately controllable in terms of the power management control function by a radio power control module. Thus, for example, a bottom portion 220 of the MAC 210 may be powered down, while an upper portion 230 containing a timing and synchronization module and digital signal processing (DSP) module may be left in a power on state. Thus, power consumption is reduced by only powering down a portion of MAC 210 extending battery life of the radio receiver. Here, a packet processing hardware module, a security module, an event scheduler module and other modules may be powered down separately from the modules in the upper portion of the MAC.

The following table further illustrates operation of the present invention and, more particularly, the aspect of the invention illustrate in FIG. 7. The power state table illustrates a mapping between ranges of time-specific radio receiver elements that may be powered down and then back up in a manner that saves power. Thus, for a value of "t" that is less than T1, no device is powered down. For a value of "t" that is between T4 and T5, the local oscillator crystal is powered down to a reduced power mode of operation as discussed before. For a value of "t" that exceeds T5, all radio receiver elements may be powered down.

| \multicolumn{3}{c}{Power State Table} | | |
|---|---|---|
| Rx inactive time | Rx element | State |
| t < T1 | Analog Front End | on |
|  | Physical BB Processor | on |
|  | LO Crystal | on |
|  | LO Crystal Amp. | on |
|  | LO PLL | on |
|  | LO Clock Distribution Tree | on |
|  | MAC Processor (1$^{st}$ portion) | on |
|  | MAC Processor (1$^{st}$ portion) | on |
| T1 < t < T2 | Analog Front End | reduced power |
|  | Physical BB Processor | on |
|  | LO Crystal | on |
|  | LO Crystal Amp. | on |
|  | LO PLL | on |
|  | LO Clock Distribution Tree | on |
|  | MAC Processor (1$^{st}$ portion) | off |
|  | MAC Processor (1$^{st}$ portion) |  |
| T2 < t < T3 | Analog Front End | off |
|  | Physical BB Processor | on |
|  | LO Crystal | on |
|  | LO Crystal Amp. | reduced power |
|  | LO PLL | on |
|  | LO Clock Distribution Tree | off |
|  | MAC Processor (1$^{st}$ portion) | on |
|  | MAC Processor (1$^{st}$ portion) | off |
| T3 < t < T4 | Analog Front End | off |
|  | Physical BB Processor | reduced power |
|  | LO Crystal | on |
|  | LO Crystal Amp. | off |
|  | LO PLL | on |
|  | LO Clock Distribution Tree | off |
|  | MAC Processor (1$^{st}$ portion) | on |
|  | MAC Processor (1$^{st}$ portion) | off |
| T4 < t < T5 | Analog Front End | off |
|  | Physical BB Processor | off |
|  | LO Crystal | reduced power |
|  | LO Crystal Amp. | off |
|  | LO PLL | on |
|  | LO Clock Distribution Tree | off |
|  | MAC Processor (1$^{st}$ portion) | off |
|  | MAC Processor (1$^{st}$ portion) | off |
| T5 < t | Analog Front End | off |
|  | Physical BB Processor | off |
|  | LO Crystal | off |
|  | LO Crystal Amp. | off |
|  | LO PLL | off |
|  | LO Clock Distribution Tree | off |
|  | MAC Processor (1$^{st}$ portion) | off |
|  | MAC Processor (1$^{st}$ portion) | off |

The preceding power state table is exemplary of one implementation. It is understood that the mapping between inactive time and element operation may readily be defined by the operator or designer. The following power state factors table illustrates a further mapping between the radio receiver elements and timing factors. Thus, each radio receiver element includes a specific group of time values that is considered by the power control module in determining when and whether to power down an element and when to power the element back up so that it can be in an operational state by the time that an allocated time slot is received.

| element | Power down time | power up time | reduced power down time | reduced power up recovery time | timing threshold |
| --- | --- | --- | --- | --- | --- |
| Analog Front End | $t_{AFE1}$ | $t_{AFE2}$ | $t_{AFE3}$ | $t_{AFE4}$ | $t_{AFE5}$ |
| Physical BB Processor | $t_{PHY1}$ | $t_{PHY2}$ | $t_{PHY3}$ | $t_{PHY4}$ | $t_{PHY5}$ |
| LO crystal | $t_{CRYS1}$ | $t_{CRYS2}$ | $t_{CRYS3}$ | $t_{CRYS4}$ | $t_{CRYS5}$ |
| LO crystal amp | $t_{CA1}$ | $t_{CA2}$ | $t_{CA3}$ | $t_{CA4}$ | $t_{CA5}$ |
| LO PLL | $t_{PLL1}$ | $t_{PLL2}$ | $t_{PLL3}$ | $t_{PLL4}$ | $t_{PLL5}$ |
| LO clk dist. tree | $t_{CDT1}$ | $t_{CDT2}$ | $t_{CDT3}$ | $t_{CDT4}$ | $t_{CDT5}$ |
| MAC ($1^{st}$ portn) | $t_{1ST\,MAC\,1}$ | $t_{1ST\,MAC\,2}$ | $t_{1ST\,MAC\,3}$ | $t_{1ST\,MAC\,4}$ | $t_{1ST\,MAC\,5}$ |
| MAC ($2^{nd}$ portn) | $t_{2ND\,MAC\,1}$ | $t_{2ND\,MAC\,2}$ | $t_{2ND\,MAC\,3}$ | $t_{2ND\,MAC\,4}$ | $t_{2ND\,MAC\,5}$ |

Power State Factors

Each element, as may be seen, has a plurality of time values that the power control module evaluates when determining whether to power down the element. Examining the timing values for the Analog Front End, a power down time $t_{AFE1}$ defines the amount of time that is required to power down the Analog Front End. The power up time $t_{AFE2}$ illustrates the amount of time required for the Analog Front End to power up from an off state. The time value $t_{AFE3}$ illustrates the amount of time required for the Analog Front End to power down to a reduced power mode while the time value $t_{AFE4}$ illustrates the amount of time required for the Analog Front End to power up from a reduced power state. Finally, the time $t_{FE5}$ illustrates a minimum time value that is required for the inactivity time for the power savings realized from powering down (or operating in a reduced power mode) to justify powering down the element (either off or to a reduced power mode). Thus, by receiving an inactivity time value from the MAC processor or by otherwise determining the inactivity time, the power control processor is able to determine what elements can be powered down and what elements can be powered to a reduced power mode of operation.

A beacon is used, in one embodiment of the present invention, to inform a radio receiver of whether it has an allocated time slot with data. Thus, the radio receiver is able to determine whether to power an element down and when to power an element back up. Further, however, in an 802.15.3 device, the radio receiver communicates with an access point to advise it of a duration in which it will be operating in a sleep mode or powered down mode. Accordingly, the access point, upon receiving such an indication from a transmitter coupled to the radio receiver, can queue or buffer messages for the radio receiver until the expiration of the power down or sleep mode of operation.

In other embodiments of the present invention, the power control module determines what radio receiver elements may be powered down and the power down mode according to the terminal type. For example, a device that receives real time data, such as continuous bit rate data (live radio or video broadcasts, for example) may be less tolerant to having powered down modes of operation for a specified period, thereby causing an access point to queue the data therefor.

In another embodiment of the present invention, and for other communication protocols (for example, Bluetooth), a radio receiver goes into a sleep mode of operation and occasionally "sniffs" for data (wakes up to communicate with the access point to download any queued data or messages). In one embodiment of the invention, a clear channel assessment is periodically made to determine whether a receiver or receiver element should be powered up. For a specific illustration, a low noise amplifier is powered up to determine, with a crude degree of approximation, whether a channel selected by a front end channel select filter detects that the specified channel includes data or transmissions thereon. If the possibility of such transmissions seems to exist, radio receiver elements are powered up to further facilitate determining whether the radio receiver should be brought up to a fully operational state. In one alternate embodiment, a received signal strength indicator (RSSI) is used to determine whether any powered down elements should be powered back on.

In yet another embodiment of the present invention, the power control module (or the MAC) makes the power down and power up decisions and determines the duration of inactivity (power down) periods based upon a history of transmissions and receptions and, in one embodiment, in relation to known and upcoming needs. The history may evaluate device type, data type and other similar factors.

Figure 8:
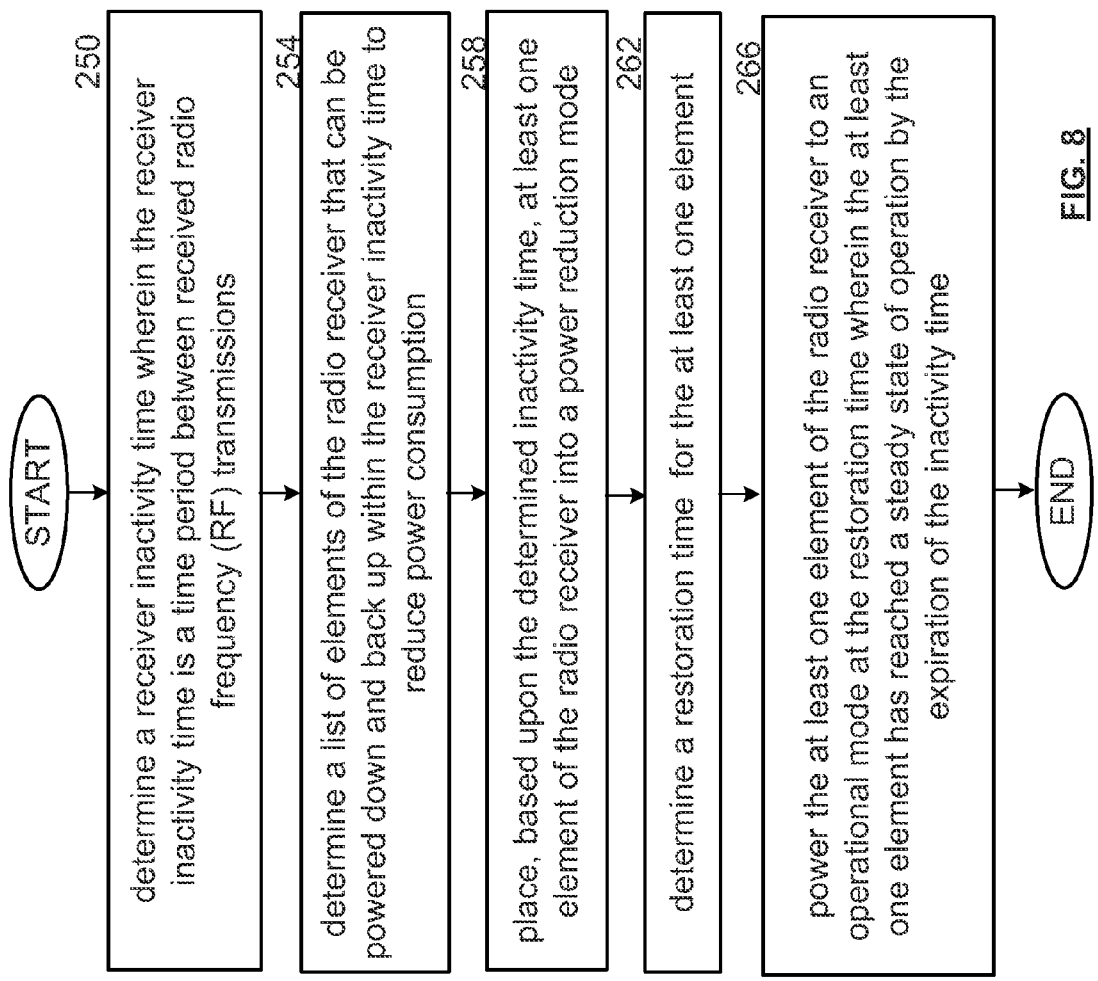
FIG. 8 is a flow chart illustrating a method for saving power in a radio receiver according to one embodiment of the present invention.

FIG. 8 is a flow chart illustrating a method for saving power in a radio receiver according to one embodiment of the present invention. First, logic within the radio receiver determines a receiver inactivity time wherein the receiver inactivity time is a time period between received radio frequency (RF) transmissions (step 250). The inactivity time is based upon a number of considerations, including known and defined communication periods, a number of communication beacons, or a known amount of time until an allocated time slot in a time divided communication system.

The logic that performs step 250, as well as the other steps described herein, may be formed in hardware or may be defined by computer instructions that are executed by hardware, such as a micro-controller, microprocessor or any other processing device. For example, the computer instructions stored in memory may be executed by a baseband processor in one embodiment of the present invention. The remaining discussion will be made from the perspective of the radio receiver, though it is understood that any device performing the inventive steps are specifically within the scope of the present invention.

After the receiver inactivity time is determined, the radio receiver determines a list of elements of the radio receiver that can be powered down and back up within the receiver inactivity time to reduce power consumption (step 254). Generally, this step includes determining if the receiver inactivity time is greater than the sum of the time required to power an element down and then back up (power cycle time). The elements in the list of elements include at least one of a RF front end section, a low noise amplifier, a local oscillator crystal, a local oscillator crystal amplifier, a local oscillator phase-locked-loop module, a local oscillator clock distribution tree, a filtering module, a physical baseband processor module, an analog-to-digital conversion module, and a first portion of the MAC processor, or a second portion of the MAC processor.

For some elements there will not be enough time to power down, but there may be enough time to power down to a reduced power mode and then back up. For example, a local oscillator may be able to power down portions of its circuitry, or even merely reduce a voltage therefor, to reduce overall power consumption in situations in which the local oscillator would not be able to entirely power down and back up within the determined inactivity time. Thus, the next step is to place at least one circuit element of the radio receiver into a power reduction mode (step 258).

In addition to placing the at least one circuit element into a power reduction mode, the radio receiver determines a restoration time for the at least one circuit element (step 262). The restoration time is approximately equal to the determined inactivity time minus an element wake up time for the at least one circuit element. Finally, the radio receiver provides power to the at least one circuit element of the radio receiver to restore it to an operational mode at the restoration time wherein the at least one circuit element has reached a steady state of operation by the expiration of the inactivity time (step 266).

In addition to performing the above-described steps on an element-by-element basis, the above steps may be performed for groups of elements. For example, a first group of circuit elements having a power cycle time value that is within a first range of time may be powered down as long as the inactivity time is also within the first range of time and is greater than the greatest power cycle time value of the elements listed in the first group. Similarly, multiple groups may be formed for multiple ranges of time. One advantage of grouping elements in this manner is that processing requirements to determine what elements should be powered down for a given activity time is reduced.

Finally, the above-described processes have been in the context of a single receiver. It is understood that a transceiver may well have a plurality of radio receivers. In such a case, the above described processes may readily be performed for the elements on a receiver by receiver basis or, alternatively, for all receiver elements in the plurality of radio receivers without distinction as to which radio receiver an element belongs.

Figure 9:
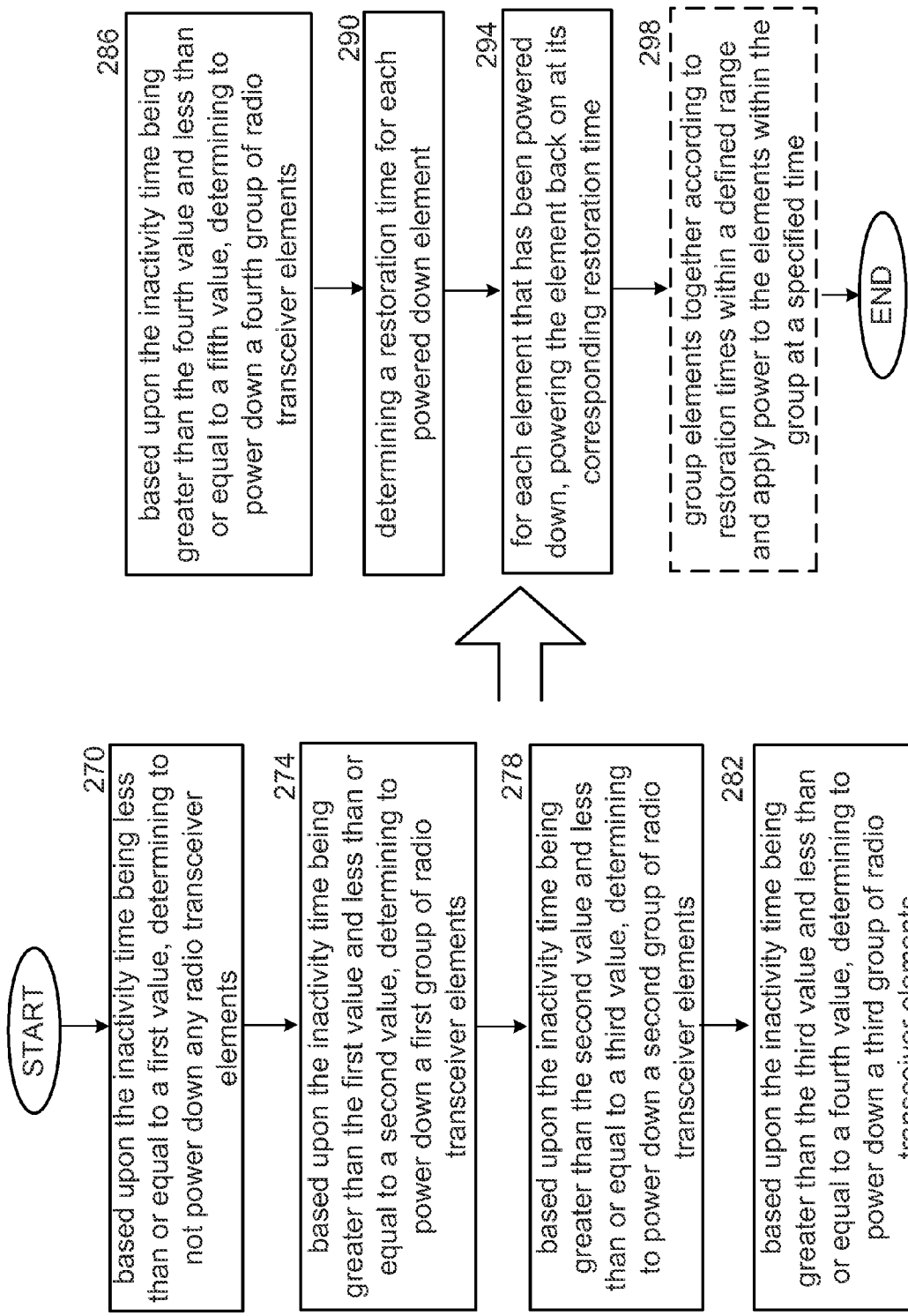
FIG. 9 illustrates an alternate method within a radio transceiver integrated circuit for reducing power consumption.

FIG. 9 illustrates an alternate method within a radio transceiver integrated circuit for reducing power consumption. The method of FIG. 9 comprises determining to not power down any radio transceiver elements based upon the inactivity time being less than or equal to a first value (step 270). Thereafter, the process includes, based upon the inactivity time being greater than the first value and less than a second value, determining to power down a first group of transceiver elements (step 274). The first group of elements is a subset of a group of all elements. The invention further includes, based upon the inactivity time being greater than the second value and less than or equal to a third value, determining to power down a second group of radio transceiver elements (step 278). Additionally, the inventive process includes, based upon the inactivity time being greater than the third value and less than or equal to a fourth value, determining to power down a third group of radio transceiver elements (step 282). The invention further includes, based upon the inactivity time being greater than the fourth value and less than or equal to a fifth value, determining to power down a fourth group of radio transceiver elements (step 286). As may be seen, the invention, in this embodiment, includes powering down radio transceiver elements in groups according to ranges of inactivity time.

The invention further includes determining a restoration time for each powered down element (step 290). Additionally, for each element that has been powered down, the method includes powering the element back on at its corresponding restoration time (step 294). In one embodiment of the invention, elements may be grouped together according to power cycle times being within the same range of restoration time values (step 298).

Figure 10:
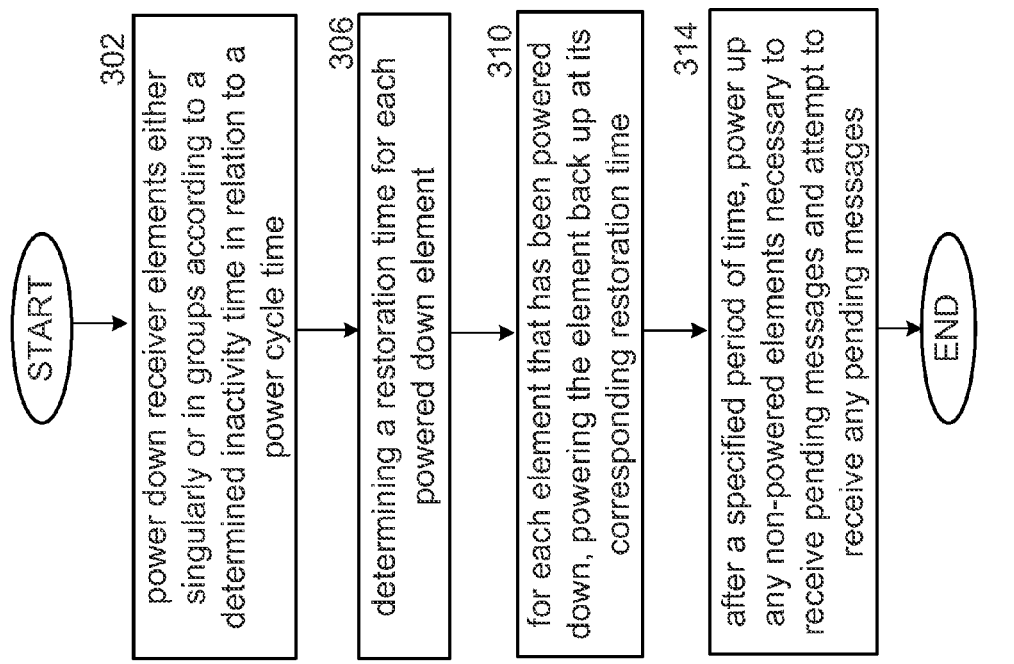
FIG. 10 illustrates one embodiment of the inventive method utilizing a periodic power mode of operation.

FIG. 10 illustrates one embodiment of the inventive method utilizing a periodic power mode of operation. Initially, a handheld host powers down receiver elements either singularly or in groups according to a determined inactivity time in relation to a power cycle time (step 302). In this example, the inactivity time may be one that is user selected (rather than known communication signal timing events). Thereafter, the invention includes determining a restoration time for each powered down element (step 306). For each element that has been powered down, the invention includes powering the element back up at its corresponding restoration time (step 310). Finally, after a specified period of time, the invention includes powering up any non-powered elements necessary to receive pending messages and attempt to receive any pending messages (step 314). In one example, the non-powered elements may be in a dormant state for a prolonged period. Thus, the non-powered elements are powered temporarily to sniff for indications that an external device is attempting to communicate with the hand held host or, alternatively, has queued messages or data for the handheld host.

The preceding discussion has presented a method and apparatus for a radio receiver, including a power control module for extending a receiver's battery life. As one of average skill in the art will appreciate, other embodiments may be derived from the teaching of the present invention, without deviating from the scope of the claims.

What is claimed is:

1. A radio receiver, comprising:
an RF front end for receiving an inbound radio frequency (RF) signal and a local oscillation and producing a baseband signal from the inbound RF signal and the local oscillation;
a baseband processing module for producing inbound data from the baseband signal;
a local oscillator for generating the local oscillation; and
a power control module for:
identifying a receiver inactivity time corresponding to a time period between received RF signals in an established communication link;
identifying one or more elements of at least one of the RF front end, baseband processing module and local oscillator that can be powered down and back up within the receiver inactivity time to reduce power consumption; and
identifying a restoration time for at least one element of the one or more elements, wherein the restoration time is a time at which the at least one element should automatically be powered on in order to achieve an operational mode steady state prior to the expiration of the receiver inactivity time.

2. The radio receiver of claim 1, wherein the power control module further:
powers down the at least one element during the receiver inactivity time; and
powers the at least one element of the radio receiver back to an operational mode based upon the restoration time such that the at least one element reaches a steady state of operation by the expiration of the receiver inactivity time.

3. The radio receiver of claim 1, wherein the power control module determines the receiver inactivity time based upon known and defined communication periods, a number of communication beacons, or a known amount of time until an allocated time slot in a time divided communication system.

4. The radio receiver of claim 1, wherein the at least one element comprises at least one of the RF front end, a low noise amplifier, a local oscillator crystal, a local oscillator crystal amplifier, a local oscillator phase-locked-loop module, a local oscillator clock distribution tree, a filtering module, the baseband processing module, an analog-to-digital conversion module, a first portion of a medium access control (MAC) processor, or a second portion of the MAC processor.

5. The radio receiver of claim 1, wherein the restoration time is approximately equal to the determined receiver inactivity time minus an element wake up time for the at least one element.

6. A radio receiver, comprising:
an RF front end for receiving an inbound radio frequency (RF) signal and a local oscillation and producing a baseband signal from the inbound RF signal and the local oscillation;
a baseband processing module for producing inbound data from the baseband signal;
a local oscillator for generating the local oscillation; and
a power control module for:
identifying a radio receiver element inactivity time for at least one radio receiver element of the RF front end, baseband processing module and local oscillator in an established communication link;
powering down, based upon the determined radio receiver element inactivity time, the at least one radio receiver element;
identifying a restoration time for the at least one radio receiver element, wherein the restoration time is a time at which the at least one radio receiver element should automatically be powered on in order to achieve an operational mode steady state prior to the expiration of the radio receiver element inactivity time; and
powering the at least one radio receiver element to an operational mode based solely on the restoration time.

7. The radio receiver of claim 6, wherein the power control module determines the radio receiver element inactivity time based upon known and defined communication periods, a number of communication beacons, or a known amount of time until an allocated time slot in a time divided communication system.

8. The radio receiver of claim 6, wherein the restoration time is approximately equal to the determined radio receiver inactivity time minus an element wake up time for the at least one radio receiver element.

9. The radio receiver of claim 6, wherein the at least one radio receiver element comprises at least one of the RF front end, a low noise amplifier, a local oscillator crystal, a local oscillator crystal amplifier, a local oscillator phase-locked-loop module, a local oscillator clock distribution tree, a filtering module, the baseband processing module, an analog-to-digital conversion module, a first portion of a medium access control (MAC) processor, or a second portion of the MAC processor.

10. The radio receiver of claim 6, wherein the power control module further:
identifies a respective radio receiver element inactivity time for each of a plurality of radio receiver elements of the RF front end, the baseband processing module and the local oscillator;
powers down, based upon the determined respective radio receiver element inactivity time, the plurality of radio receiver elements;
identifies a respective restoration time for each of the plurality of radio receiver elements; and
powers the plurality of radio receiver elements to an operational mode at the respective restoration time of each of the plurality of radio receiver elements.

11. The radio receiver of claim 10, wherein the respective radio receiver element inactivity time for each of the plurality of radio receiver elements is determined based upon a number of communication beacons.

12. A radio receiver, comprising:
an RF front end for receiving an inbound radio frequency (RF) signal and a local oscillation and producing a baseband signal from the inbound RF signal and the local oscillation;
a baseband processing module for producing inbound data from the baseband signal;
a local oscillator for generating the local oscillation; and
a power control module for:
identifying a radio receiver element inactivity time for at least one radio receiver element of the RF front end, the baseband processing module and the local oscillator in an established communication link;
identifying a restoration time for the at least one radio receiver element, wherein the restoration time is a time at which the at least one radio receiver element should automatically be powered on in order to achieve an operational mode steady state prior to the expiration of the radio receiver element inactivity time;
determining whether to place the at least one radio receiver element into a power reduction mode based on the radio receiver element inactivity time;
determining what type of a plurality of types of power reduction modes should be selected for the at least one radio receiver element if it is to be placed into the power reduction mode;
placing the at least one radio receiver element into the selected power reduction mode; and
powering the at least one radio receiver element to an operational mode based solely on the restoration time.

13. The radio receiver of claim 12, wherein the power control module further determines the receiver element inactivity time based upon known and defined communication periods, a number of communication beacons, or a known amount of time until an allocated time slot in a time divided communication system.

14. The radio receiver of claim 12, wherein the restoration time is approximately equal to the determined inactivity time minus an element wake up time for the at least one radio receiver element.

15. The radio receiver of claim 12, wherein the at least one radio receiver element comprises at least one of the RF front end section, a low noise amplifier, a local oscillator crystal, a local oscillator crystal amplifier, a local oscillator phase-locked-loop module, a local oscillator clock distribution tree, a filtering module, the baseband processing module, an analog-to-digital conversion module, a first portion of a medium access control (MAC) processor, or a second portion of the MAC processor.

16. The radio receiver of claim 12, wherein the power control module further:
identifies a respective radio receiver element inactivity time for each of a plurality of radio receiver elements of the RF front end, the baseband processing module and the local oscillator; and
identifies a respective restoration time for each of the plurality of radio receiver elements.

17. The radio receiver of claim 16, wherein the power control module further:

places each of the plurality of radio receiver elements in a power reduction mode based upon the determined respective receiver element inactivity time; and powers each of the plurality of radio receiver elements to an operational mode at the respective restoration time determined for each of the plurality of radio receiver elements.

18. The radio receiver of claim 12, wherein the selected power reduction mode is a partial power reduction mode.

19. The radio receiver of claim 12, wherein the selected power reduction mode is a full power reduction mode.

20. A radio receiver, comprising:

an RF front end for receiving an inbound radio frequency (RF) signal and a local oscillation and producing a baseband signal from the inbound RF signal and the local oscillation;

a baseband processing module for producing inbound data from the baseband signal;

a local oscillator for generating the local oscillation; and a power control module for:

identifying one or more elements of the RF front end, the baseband processing module and the local oscillator that can be powered down and back up within a receiver inactivity time to reduce power consumption, wherein the receiver inactivity time is a time period between received RF signals in an established communication link; and powering at least one element of the one or more elements to an operational mode based only upon a restoration time, wherein the at least one element has reached a steady state of operation by the expiration of the receiver inactivity time, wherein the restoration time is a time at which the at least one element should automatically be powered on in order to achieve an operational mode steady state prior to the expiration of the receiver inactivity time.

* * * * *